Johnson & Fitzgerald,
Hose Coupling,
No. 98,774. Patented Jan. 11, 1870.
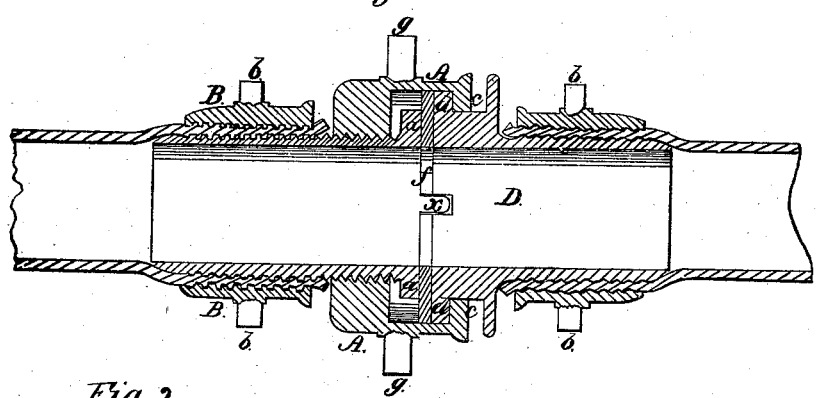
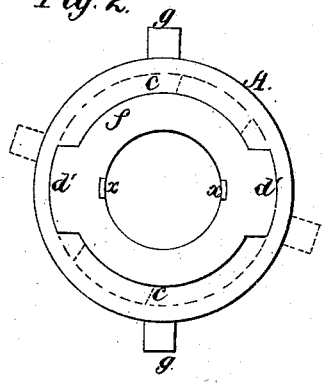
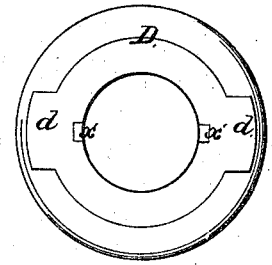
Witnesses,
Inventors,

United States Patent Office.

THOMAS L. JOHNSON AND JOHN FITZGERALD, OF ROCHESTER, NEW YORK.

Letters Patent No. 98,774, dated January 11, 1870.

IMPROVEMENT IN HOSE-COUPLING.

The Schedule referred to in these Letters Patent and making part of the same.

*To all whom it may concern:*

Be it known that we, THOMAS L. JOHNSON and JOHN FITZGERALD, of Rochester, in the county of Monroe, and State of New York, have invented certain new and useful Improvements in "Hose-Couplings;" and we do hereby declare that the following is a full, clear, and exact description thereof, reference being had to the accompanying drawings, making part of this specification, in which—

Figure 1 is a vertical central section of our invention.

Figure 2 is an elevation of the female portion of the coupling.

Figure 3 is a similar view of the male portion.

The object and nature of our invention will be understood by reference to the specification and drawings, and to enable others to make and use the same, we will describe its construction and operation.

We secure the hose to the necks of the couplings by means of the collars B, fig. 1.

These collars are internally conical, and threaded to correspond with the thread on the conical necks of the couplings, and are made of such a diameter as to just admit the hose between them and said necks.

The collars are first slipped upon the hose, the ends of the latter drawn upon the coupling-necks, and the collars then screwed over both.

The consequence is that the material of which the hose is composed is forced into the threads and firmly secured. Should the material shrink or become loose, it is easily tightened by means of the tapering coupling-necks and collars B. The thread is slightly flattened or rounded, as shown, to prevent cutting or tearing of the hose, and lugs $b$ are provided upon the collars, to which a wrench may be applied, if necessary.

To connect the two parts of the coupling, we provide the union nut A, screwed upon the female portion of the coupling, between the collar B and flange $a$. The outer end of this union nut is cored out large enough to receive the lugs $d$ upon the male coupling D, and has an internal flange, $c$, at its outer edge, under which the lugs $d$ catch. This flange is cut away at proper points, as shown at $d'$, fig. 2, to allow the lugs $d$ to enter.

The diameter of the flange $a$ is such that the flange $c$ slips easily over it.

The packing-ring $f$ rests between the flange $a$ and the end of the male coupling, and is prevented from dropping out by the flange $c$.

We also provide the spurs $x$, projecting from either part of the coupling, and entering recesses formed in the opposite portion. The object of this is to prevent the female coupling from revolving with the union nut A.

To couple the hose, the union nut is turned till the spurs $x$ register with the openings $d'$ in the flange $c$, as shown in fig. 2. The male coupling D is then inserted, the spurs $x$ entering the recesses $x'$, and the nut A revolved on the threaded neck till the packing is tightly pinched.

The longitudinal adjustment of the nut A may be such, with relation to the thickness of the packing-ring and lugs $d$, that the latter may catch easily under the flange $c$, and the joint be made tight by less than one-half a revolution of the nut, as shown by dotted lines in fig. 2. This adjustment is found when the coupling is fitted up, and then end-motion of the nut limited to about one revolution, by the collar B and flange $a$.

The lugs $g$ are provided on the nut A for the purpose of applying a wrench, if necessary.

It may be desirable that the thread in the union nut A be left-handed, whereby the coupling is tightened by a right-hand turn.

In place of the lugs $b$ and $g$, recesses may be provided in the collar B and nut A, into which a wrench may be inserted.

The hydrant-connection for this coupling may be covered with a cap similar to the female portion of the coupling, except that in place of the coupling-neck a threaded plug is used, having the usual flange $a$.

It will be observed that the attachment of the hose to the coupling is quickly and efficiently made, and also, the operation of coupling the hose is performed in a fraction of the time required by the ordinary screw-coupling, while the arrangement is simple and cheap.

What we claim as our invention, and desire to secure by Letters Patent, is.

The union nut A and male coupling D, constructed substantially as described, in combination with the spurs $x$ and recesses $x'$, for the purposes herein set forth.

T. L. JOHNSON.
JOHN FITZGERALD.

Witnesses:
WM. S. LOUGHBOROUGH,
DANIEL WOOD.